Patented Oct. 27, 1953

2,657,235

UNITED STATES PATENT OFFICE 2,657,235

ARYLOXYBENZALDEHYDETHIOSEMI-CARBAZONES

Hans Schmidt, Wuppertal-Vohwinkel, and Fritz Mietzsch and Robert Behnisch, Wuppertal-Elberfeld, Germany, assignors to Schenley Industries, Inc., New York, N. Y., a corporation of Delaware No Drawing. Application March 20, 1951, Serial No. 216,664. In Germany March 27, 1950

6 Claims. (Cl. 260—552)

This invention relates generally to organic chemical compounds that are useful in chemotherapy and, in a more particular sense, it is concerned with a group of novel aryl-substituted benzalthiosemicarbazones which are characterized by especially strong inhibitory effects upon pathogenic microorganisms of the family Myco. tuberculosis.

The products of the invention, apart from their tuberculostatic properties and their activity against leprosy, are distinguished by a strong antiinflammatory action.

The novel compounds of this invention may be represented by the formula:

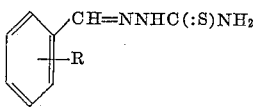

wherein R is a phenoxy substituent of the aromatic nucleus which may be in the ortho, meta or para position, and in which the phenyl moiety may be unsubstituted or bear nuclear substituents such as one or more aryloxy, lower alkoxy, halo, amino, arylamino, alkylamino, acylamino, nitro, hydroxy, acyloxy, alkylmercapto, alkylsulfono, carboxylic acid and alkylcarboxylic acid groups. These substituents may also be attached to the benzene nucleus of the benzal radical.

These benzalthiosemicarbazones may be prepared in the usual manner by reacting the correspondingly substituted aldehydes with thiosemicarbazide. Instead of the aldehydes as such, their functional derivatives such as acetals, acetates, oximes, hydrazones, semicarbazones etc. may be employed. To illustrate a typical procedure for preparing these aryloxy-substituted benzalthiosemicarbazones, the following example is provided, without intention that it will be construed as a limitation upon the invention.

Example 1

About 45.5 grams of thiosemicarbazide are dissolved, with heating if necessary, in 250 cc. of water and this solution is added to a hot solution of 110 grams of 4-(4'-nitrophenoxy)-benzaldehyde dissolved in a liter of alcohol. The mixture is boiled under reflux in carbon dioxide atmosphere for a few hours, after which the reaction product begins to crystallize from the hot solution. The solution then is cooled and the precipitated product, 4-(4'-nitro-phenoxy)-benzal-thiosemicarbazone is recovered in abundant yield as a light-yellow, water-insoluble microcrystalline powder, melting at about 214° C.

By reacting thiosemicarbazide with the corresponding substituted phenoxy-benzaldehyde, the thiosemicarbazone of 4-(2'-nitrophenoxy)-benzaldehyde may be prepared. This compound melts at 201° C. 4-(4'-aminophenoxy)-benzalthiosemicarbazone may be obtained by reducing the 4-(4'-nitrophenoxy)-benzalthiosemicarbazone described above with an aqueous-alcoholic sodium bisulfide solution. After purification the compound melts at 203° C. with decomposition.

4-aminophenoxybenzalthiosemicarbazone may be further reacted with thioglycolic acid anhydride to yield the dithioglycolate, which decomposes in a capillary tube at 192° C. The dithioglycolate may be converted into an easily soluble sodium salt by dissolving in an equivalent amount (1 mol) of sodium hydroxide solution and precipitating with acetone.

Example 2

4-(4'-acetaminophenoxy)-benzaldehyde obtainable by reduction of 4-(4'-nitrophenoxy)-benzaldehyde with sodium bisulfite solution and acetylation, melting point about 114° C. is dissolved in an amount of 25.5 grams in 100 ccs. of methanol and the solution added to a hot solution of 9 grams of thiosemicarbazide in 60 ccs. of water. The mixture is refluxed after addition of some drops of glacial acetic acid. Separation of the reaction product starts soon. The thiosemicarbazone recovered is insoluble in water and melts towards 220° C. with decomposition. The compound can also be obtained by subsequently acetylating 4-(4'-aminophenoxy)-benzalthiosemicarbazone.

Example 3

22.8 grams of 4-(4'-methoxyphenoxy)-benzaldehyde in 160 ccs. of methanol are mixed with a hot solution of 9 grams of thiosemicarbazide in 50 ccs. of water and the solution boiled under carbon dioxide after the addition of a few drops of glacial acetic acid. The separation of the reaction product starts almost immediately. The thiosemicarbazone recovered is colorless, insoluble in water, and melts at about 174° C.

Example 4

9 grams of thiosemicarbazide are dissolved by heating in 50 ccs. of water. The solution of 23.2 grams of 4-(4'-chlorophenoxy)-benzaldehyde in 180 ccs. of methanol is added and the mixture is refluxed for some hours, after the addition of a few drops of glacial acetic acid. The thiosemicarbazone formed separates on cooling in the form of weakly colored needles. It is insoluble in water and may be recrystallized from ethyl alcohol, its melting point then being about 174° C.

In an analogous manner, for instance, the following thiosemicarbazones are obtainable:

4 - phenoxybenzalthiosemicarbazone, colorless powder, melting point about 142° C., 3-(2'-4-dinitro) - phenoxybenzalthiosemicarbazone, yellow powder, melting point about 228° C., diphenylenoxide - 3 - aldehydethiosemicarbazone, colorless powder, melting point about 226° C., and 4 - (3',5' - dimethyl) - phenoxy - benzalthiosemicarbazone, melting point 166° C., obtainable from 4 - (3',5' - dimethyl)-phenoxybenzaldehyde and thiosemicarbazide. The 4-(3',5'-dimethyl)-phenoxybenzaldehyde is obtainable from 4-(3',5'-dimethyl) - phenoxynitrobenzene (boiling point at 15 millimeters=222° C.), which after conversion into the amine is converted into the aldehyde according to the method of Stephens.

Having thus described the subject matter of the present invention, what it is desired to secure by Letters Patent is:

1. A novel chemical compound represented by the formula:

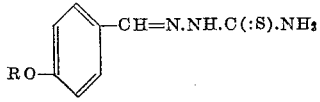

wherein R is a radical chosen from the group consisting of phenyl, p-nitrophenyl, p-aminophenyl, p-acetaminophenyl and p-methoxyphenyl.

2. A novel chemical compound as defined in claim 1 wherein R is a phenyl group.

3. A novel chemical compound as defined in claim 1 wherein R is p-methoxyphenyl.

4. A novel chemical compound as defined in claim 1 wherein R is a p-aminophenyl group.

5. A novel chemical compound as defined in claim 1 wherein R is p-nitrophenyl.

6. A novel chemical compound as defined in claim 1 wherein R is p-acetoaminophenyl.

HANS SCHMIDT.
FRITZ MIETZSCH.
ROBERT BEHNISCH.

References Cited in the file of this patent

Domagk: "Naturwissenschaften," vol. 33, Nov. 30, 1946, p. 315.

Behnisch et al.: "Naturwissenschaften," vol. 33, Nov. 30, 1946, p. 315.

Behnisch et al.: "The American Review of Tuberc.," vol. 61, Jan. 1950, pp. 1 to 7.